United States Patent
Hue

(10) Patent No.: US 9,776,554 B2
(45) Date of Patent: Oct. 3, 2017

(54) LIGHTING AND/OR SIGNALING LIGHT-EMITTING DEVICE FOR VEHICLES

(71) Applicant: Valeo Vision, Bobigny (FR)

(72) Inventor: David Hue, Butry sur Oise (FR)

(73) Assignee: Valeo Vision, Bobigny (FR)

(*) Notice: Subject to any disclaimer, the term of this patent is extended or adjusted under 35 U.S.C. 154(b) by 0 days.

(21) Appl. No.: 15/161,413

(22) Filed: May 23, 2016

(65) Prior Publication Data
US 2016/0347238 A1 Dec. 1, 2016

(30) Foreign Application Priority Data
May 26, 2015 (FR) .................................. 15 54713

(51) Int. Cl.
| | | |
|---|---|---|
| *B60Q 1/02* | (2006.01) | |
| *B60Q 1/14* | (2006.01) | |
| *B60Q 1/00* | (2006.01) | |
| *H04B 10/116* | (2013.01) | |
| *G01S 13/93* | (2006.01) | |

(52) U.S. Cl.
CPC ......... *B60Q 1/1423* (2013.01); *B60Q 1/0017* (2013.01); *B60Q 1/143* (2013.01); *H04B 10/116* (2013.01); *B60Q 2300/312* (2013.01); *B60Q 2300/314* (2013.01); *B60Q 2300/41* (2013.01); *G01S 2013/936* (2013.01)

(58) Field of Classification Search
CPC ........ B60Q 1/1423; B60Q 1/143; B60Q 1/17; B60Q 1/14; B60Q 1/02
USPC ...................... 315/82; 362/526, 516, 27, 276
See application file for complete search history.

(56) References Cited

U.S. PATENT DOCUMENTS

| | | | | |
|---|---|---|---|---|
| 6,049,171 A | * | 4/2000 | Stam ...................... | B60Q 1/085 250/208.1 |
| 7,961,086 B2 | | 6/2011 | Bradley | |
| 8,922,389 B2 | | 12/2014 | Dubosc et al. | |
| 8,981,647 B2 | * | 3/2015 | Ding ........................ | B60Q 1/28 315/76 |
| 2007/0211482 A1 | * | 9/2007 | Rebut .................. | B60Q 1/1423 362/466 |
| 2007/0242337 A1 | | 10/2007 | Bradley | |

(Continued)

FOREIGN PATENT DOCUMENTS

EP          2444284 A1     4/2012

*Primary Examiner* — Douglas W Owens
*Assistant Examiner* — Syed M Kaiser
(74) *Attorney, Agent, or Firm* — Jacox, Meckstroth & Jenkins

(57) ABSTRACT

A light-emitting device, notably a lighting and/or signaling device for a motor vehicle, including at least one first light source intended to emit a first modulated light beam coding information; at least one second light source intended to emit a second modulated light beam coding information; a control device adapted: to determine, on receiving information to be transmitted via the light-emitting device, if a first light beam intended to be emitted by the first source should be modulated to code the information to be transmitted and/or if a second beam intended to be emitted by the second source should be modulated to code the information to be transmitted, the determination depending on information relating to the local solar illumination; as a function of the determination, to modulate the first light beam and/or the energization second light beam to code the information to be transmitted.

21 Claims, 3 Drawing Sheets

(56) References Cited

U.S. PATENT DOCUMENTS

| | | |
|---|---|---|
| 2008/0122606 A1 | 5/2008 | Bradley |
| 2011/0305030 A1 | 12/2011 | Dubosc et al. |
| 2013/0038445 A1* | 2/2013 | Tatara .................. B60Q 1/0017 340/463 |
| 2013/0057150 A1* | 3/2013 | Darsy ..................... B60Q 1/28 315/82 |
| 2013/0272009 A1* | 10/2013 | Fujiu ................... B60Q 1/0058 362/517 |
| 2015/0146446 A1* | 5/2015 | Barta .................. F21S 48/1159 362/516 |
| 2016/0033103 A1* | 2/2016 | Nakano ................. F21S 48/115 362/487 |
| 2016/0121783 A1* | 5/2016 | Takagimoto ......... B60Q 11/005 315/82 |
| 2016/0290591 A1* | 10/2016 | Huang .................. F21S 48/328 |
| 2016/0341385 A1* | 11/2016 | Kanayama ............ F21S 48/125 |

\* cited by examiner

LIGHTING AND/OR SIGNALING LIGHT-EMITTING DEVICE FOR VEHICLES

CROSS-REFERENCE TO RELATED APPLICATIONS

This application claims priority to the French application 1554713 filed May 26, 2015, which applications are incorporated herein by reference and made a part hereof.

BACKGROUND OF THE INVENTION

1. Field of the Invention

The present invention concerns the field of lighting modules and notably lighting modules for communicating motor vehicles.

2. Description of the Related Art

When communication/detection devices are used in a motor vehicle, a dedicated module is usually installed, for example, behind the windshield or in the bumper.

These communication/detection devices can employ various technologies (infrared, electromagnetic, etc.) in order to detect some obstacles or to communicate with other vehicles (e.g. transmission of information relating to speed, braking, roadholding, etc.).

These communication/detection devices can generate disabling mechanical integration constraints because of their bulk and the necessity to supply these devices with electrical power.

Thus, there exists a requirement to simplify (or even to eliminate) the mechanical integration constraints of these devices.

Moreover, the communication/detection devices can suffer from a limited communication/detection range. If this range can be linked to a power of the communication means (e.g. an emitter of visible light), it is difficult to envisage increasing the overall power of these communication means installed on the vehicle: indeed, these communication means could dazzle other road users if the overall power used were too great.

Thus there exists a requirement to increase the range of the communication/detection devices used in a vehicle without this increasing the overall power of those means.

SUMMARY OF THE INVENTION

The present invention improves on the situation.

To this end, the present invention proposes a light-emitting device, notably a lighting and/or signaling device for a motor vehicle, including:

at least one first light source intended to emit a first modulated light beam coding information;

at least one second light source intended to emit a second modulated light beam coding information;

a control device adapted:
to determine, on receiving information to be transmitted via the light-emitting device, if a first light beam intended to be emitted by the first source should be modulated to code the information to be transmitted and/or if a second beam intended to be emitted by the second source should be modulated to code the information to be transmitted, the determination depending on information relating to the local solar illumination;
as a function of the determination, to modulate the first light beam and/or the energization second light beam to code the information to be transmitted.

The determination step effected by the controller makes it possible to choose via which light source the information to be transmitted will be emitted. Indeed, the variation of the energization signal of the light sources can make it possible to cause those sources to blink and thus can make it possible to code information in the form of light variations.

The fact of choosing the light source to be used for such transmission (and thus choosing which energization signal to modify) can make it possible to determine the most relevant source for such transmission (e.g. main beams when turned on, DRL when the other lights are turned off). This determination therefore makes it possible to guarantee an optimum transmission quality.

The controller can be adapted to control all of the actions necessary to implement the invention.

The controller can advantageously be adapted:
on reception of information to be transmitted via the light-emitting device, to determine if a first energization signal of the at least one first source should be modified to code the information to be transmitted and/or if a second energization signal of the at least one second source should be modified to code the information to be transmitted, the determination depending on at least one item of information relating to energization of the first source:
as a function of the determination, to modify the first energization signal and/or the second energization signal to code the information to be transmitted.

It is therefore clear that in this embodiment the information relating to the local solar illumination is determined by the presence of an energization signal of the first source. For example, if the first source is intended to provide a daylight running lights (DRL) function, the presence of an energization signal of this first source makes it possible to determine that this occurs during daylight hours and that there is therefore local solar illumination. Alternatively, if the first source is intended to provide a nighttime signaling or lighting function, for example a high beam function, the presence of an energization signal of that first source makes it possible to determine that it is nighttime and therefore that there is no local solar illumination.

In one particular embodiment, the first light source or the second light source may include a semiconductor chip, notably an LED (light-emitting diode). Indeed, the light variations of semiconductor chips can be very rapid and the coding of information by blinking light can then can be imperceptible to the human eye whilst being detectable by appropriate measuring tools.

The semiconductor chips may be arranged as a single electronic component, for example a two-chip or multichip LED.

Moreover, the first light source may be adapted to emit visible light while the second light source may be adapted to emit infrared light.

Thus, the second light source may serve as transmission means when the first source is not lit (e.g. daylight driving with no high beams) or the first source is weakly lit (e.g. on standby). This second source then makes possible transmission that is invisible to the human eye.

The control device may for example include means for detecting energization of the first source, the information relating to the local solar illumination depending on the detection.

In addition to this or instead of this, the control device may include a solar sensor.

In one embodiment, the control device may be adapted to command, as a function of the determination, the emission of a single light beam by a single one of the first and second light sources and to modulate, as a function of the determination, the light beam to code the information to be transmitted.

Where necessary, the control device may be adapted to command the turning off of the other of the first and second light sources during the emission of the single light beam during daylight hours.

In one embodiment of the invention in which the first light source emits visible light and the second source infrared light, the control device is adapted to command, at night, the emission of a visible light beam by the first light source to provide a lighting and/or signaling function and to modulate that visible light beam to code the information to be transmitted, the infrared diode being kept turned off by the control device.

The control device may equally be adapted to command, as a function of the determination, the emission of a first light beam by the first light source and a second light beam by the second light source and to modulate, as a function of the determination, a single one of the first and second light beams to code the information to be transmitted.

Where necessary, the control device is adapted to command the simultaneous emission of the first and second light beams.

In one embodiment of the invention in which the first light source emits visible light and the second source infrared light, the control device is adapted to command, during daylight hours, the emission of a visible light beam by the first light source to provide a lighting and/or signaling function and to command the emission of an infrared light beam by the second light source and to modulate that infrared light beam to code the information to be transmitted.

Moreover, the controller may be configured to effect the modification of the first energization signal at a first coding frequency lower than a second coding frequency used to effect the modification of the second energization signal.

Indeed, the transmission performance (i.e. transmission errors, transmission range, etc.) of the various light sources may be different. In particular, it is found that transmission performance is higher for infrared light sources compared to visible light sources. This being so, it is possible to use a higher transmission (and therefore coding) frequency for the sources that offer higher performance.

In one embodiment of the invention, the device may include at least one headlight assembly. The first light source and/or the second light source may then be installed in the headlight assembly.

This installation makes it possible to simplify the mechanical installation constraints and, for example, to combine the existing lighting/signaling devices (i.e. headlights, position lights, reversing lights, fog lights, DRL, turn indicators, etc.) with the transmission/detection devices.

For example, the controller may be adapted to determine that the second energization signal must be modified if the energization of the first source is below a predetermined threshold.

Thus if it is determined that the first source is not powerful enough, it is possible to use instead or in addition the second light source as transmission/detection device.

Moreover, the controller may be adapted to determine that the first energization signal must not be modified if the energization of the first source is below a predetermined threshold.

Thus if it is determined that the first source is not powerful enough, it is possible to use instead the second light source as transmission/detection device.

The device may advantageously further include an optical device having a focus. The first light source and the second light source can then be installed in the vicinity of the focus.

In one particular embodiment, the device may further include a reflector. The first light source and the second light source can then be installed facing the reflector.

This installation makes it possible to produce a compact system combining lighting/signaling device and transmission/detection device. Moreover, the direction of the light emitted by each of the light sources may be reflected in the same direction without it being necessary to install a plurality of reflectors.

The device may further include:
a waveguide;
a reflector.

The first light source and the second light source can then be installed facing the waveguide and the waveguide can be installed facing the reflector.

Similarly, the device may further include:
a primary optical device having two light entry faces and one light exit face;
a secondary optical device having a focus.

The first light source and the second light source are then each installed facing one of the light entry faces of the primary optical device.

The exit face of the primary device is then installed at the focus of the secondary optical device.

In one embodiment, a frequency for coding the information to be transmitted on modification of the first signal and/or the second signal may be greater than 25 Hz.

Thus any blinking of the light source is imperceptible to the human eye.

Moreover, the controller may be configured to reduce the coding frequency of information should at least one of the following conditions apply:
an error rate during a preceding transmission has exceeded a predetermined value;
information is received relating to a presence of rain or fog.

Thus if the environmental conditions are not favorable, it is possible to reduce the coding frequency to render the transmission more robust.

The present invention is further directed to a light-emitting device, notably lighting and/or signaling device for a motor vehicle, including:
a light source;
a controller adapted:
to modify an energization signal of the light source to code information to be transmitted, the modification of the signal including multiplication of the energization signal with a coding signal including forms repeated in the signal, the forms having a given temporal extension and an amplitude,
on reception of a command, to reduce the temporal extension of the forms and to increase the amplitude of the forms in the signal.

For example, the forms repeated in the signal may be pulses or similar forms (triangular, Gaussian, part-sinusoidal, etc. forms).

The amplitude of these forms is often the maximum value of these forms during their temporal extension (excluding interference or noise in the signal linked to the coding, for example).

The conjoint reduction of the temporal extension of the forms and the increase of the amplitude make it possible to increase the power of the light pulses emitted by the light sources (and therefore the transmission range of the sources) at the same time as avoiding dazzling a road user.

In one embodiment, the controller may be adapted to modify the energization signal in accordance with a Manchester code.

Indeed, that code having a zero average coding signal makes it possible to produce a light source having an apparently constant lighting power. Moreover, that code makes it possible to prevent synchronization losses. Moreover, it is robust against interference.

Moreover, the reduction of the temporal extension may be a function of the increase of the amplitude.

This "function" may be based on calibration of the luminous power of the light source as a function of the received electrical power. Indeed, the response is not necessarily linear.

Of course, the reduction of the temporal extension may be proportional to the increase of the amplitude.

On this assumption, it is possible to produce simple control devices of relatively low cost because the linearity of the response of the lighting power as a function of the electrical power is, to the first order, a reliable approximation.

In one embodiment, the coding signal including a coding frequency, the coding frequency is retained on reducing the temporal extension of the forms.

Indeed, the fact that the temporal extension of the forms repeated in the signal is reduced does not necessarily mean that the frequency of appearance of those forms is increased. This point is demonstrated by FIG. 3b below.

These and other objects and advantages of the invention will be apparent from the following description, the accompanying drawings and the appended claims.

BRIEF DESCRIPTION OF THE ACCOMPANYING DRAWINGS

Other features and advantages of the invention will become more apparent on reading the following description. The latter is purely illustrative and must be read in conjunction with the appended drawings, in which.

DETAILED DESCRIPTION OF THE PREFERRED EMBODIMENTS

Figure 1:
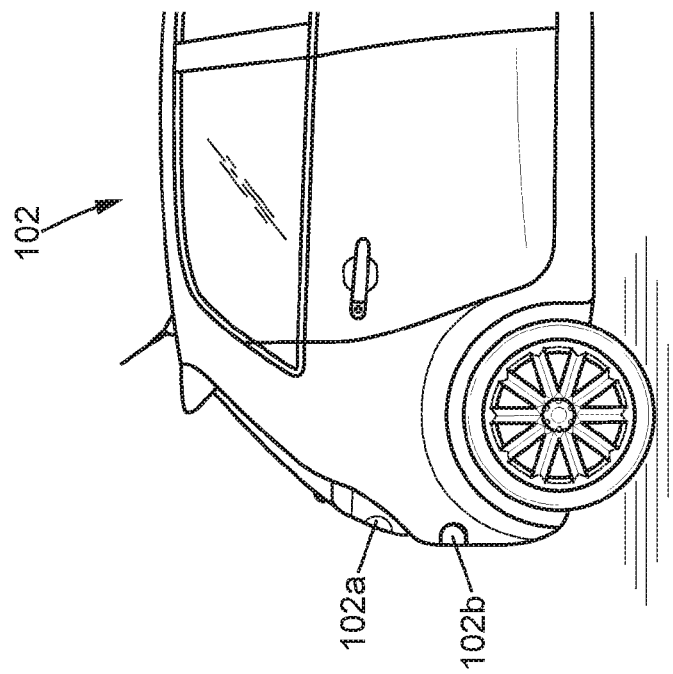
FIG. 1 shows communication between two motor vehicles in one particular embodiment of the invention.
Figure 1:
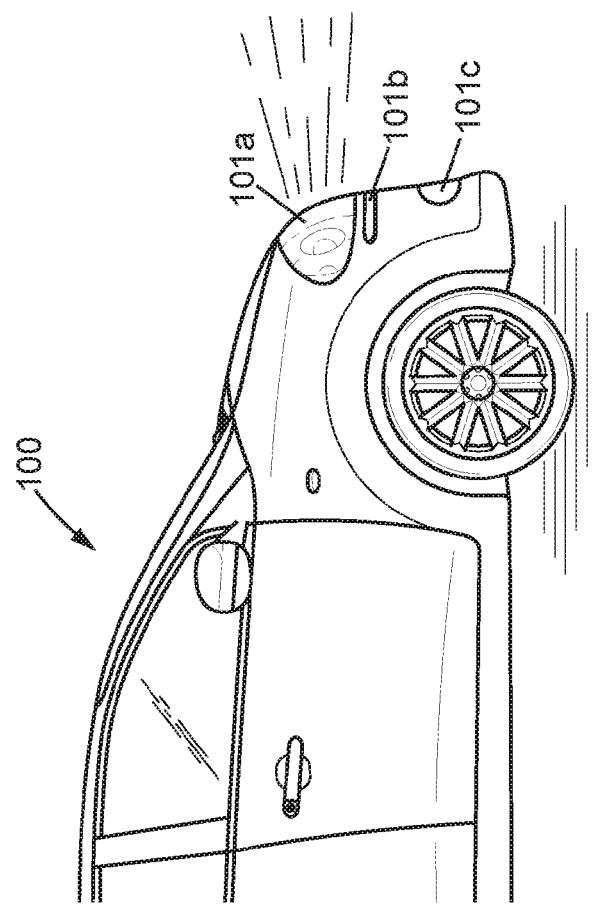

FIG. 1 shows communication between two motor vehicles 100, 102 in one particular embodiment of the invention.

During travel in a motor vehicle 100, 102, it may be useful for that motor vehicle 100, 102 to interact with its near environment: possible obstacles, nearby cars, road signs, etc.

Indeed, these interactions can make it possible for the motor vehicle 100, 102 to adapt the driving conditions offered to the driver of the motor vehicle 100, 102. Without this being limiting on the invention, these interactions may include:

the reception/transmission from a road sign of the maximum speed allowed on a road in order for the motor vehicle 100, 102 to be able to configure a speed "limiter" of the motor vehicle 100, 102;

the reception/transmission of the current driving speed of the vehicle/other nearby motor vehicles 100, 102 in order to adapt the current speed to the average speed of the other motor vehicles 100, 102;

the estimation of the distances of other motor vehicles 100, 102;

the reception/transmission of sudden braking information in order for the other motor vehicles 100, 102 to be able to act accordingly (e.g. braking and turning on of emergency lights);

etc.

As indicated above, it is advantageously possible to use the existing lighting or signaling devices (e.g. LED headlights 101a, daylight running lights (DRL) 101b, position lights, fog lights 101c or 102b, in the rear lights 102a, etc.) in order to serve as emitters of the communication/detection devices.

The combination of the existing lighting or signaling devices 101a, 101b, 101c, 102b, 102a and the emitters of the communication/detection devices therefore makes it possible to gain a significant amount of space and to reduce the mechanical installation constraints.

Thus if the existing lighting or signaling devices 101a, 101b, 101c, 102b, 102a are turned on (e.g. the driver has wanted their headlights to be turned on), it is possible to cause these lighting or signaling devices 101a, 101b, 101c, 102b, 102a to blink at a high frequency in order to be able to transmit information and thus to be able to cause these lighting or signaling devices 101a, 101b, 101c, 102b, 102a to operate as emitters of communication/detection devices.

Of course, the blinking of these lighting or signaling devices 101a, 101b, 101c, 102b, 102a must be sufficiently fast to prevent the human eye detecting this blinking or for the latter to cause visual fatigue. This being so, the blinking frequency used is advantageously higher than the reciprocal of the retinal persistence time ($>=25$ Hz).

It is possible for the type of lighting or signaling devices 101a, 101b, 101c, 102b, 102a used to limit the blinking frequency: indeed, some bulbs/LED or other semiconductor emitter chips may have maximum frequencies beyond which the lighting or signaling device 101a, 101b, 101c, 102b, 102a deteriorates or beyond which the blinking is no longer visible (the lighting or signaling device 101a, 101b, 101c, 102b, 102a then emitting light continuously).

Nevertheless, and for LED or other semiconductor emitting chips, it is common for them to be able to blink at frequencies of the order of a few hundred Hertz (e.g. 100 Hz, 200 Hz, 500 Hz).

If it is advantageous to cause the lighting or signaling devices 101a, 101b, 101c, 102b, 102a to blink at frequencies close to their maximum blinking frequency (e.g. 10% below their maximum blinking frequency) (the speed of transmission of the data then being at a maximum), that frequency may be dynamically reduced under certain conditions:

presence of fog or rain (information obtained via the rain detectors on the windshield, for example, via the turning on of the windshield wipers by the driver, via meteorological data from the internet, etc.)

error relates detected during a preceding transmission above a predetermined threshold;

etc.

The dynamic reduction of the frequency therefore makes it possible for the communication/detection channel to continue to be reliable despite the fact that the transmission conditions are deteriorating.

Instead of or in addition to this frequency reduction, it is possible to introduce an error corrector code into the transmission or to strengthen the error corrector code that exists already.

The blinking may be complete blinking of the light source (i.e. a time period during which the source is emitting, a time period during which the source is not emitting), but this blinking may also be a partial blinking (i.e. variation of the luminous intensity of the light source between two non-zero values). In order to produce this blinking, it is possible to combine with the supply voltage of the light source an information signal of appropriate frequency (i.e. a few hundred Hertz as mentioned above).

Moreover, the frequency may be variable as a function of the light source used. Indeed, it is found that the quality of the transmission can be better for infrared light sources (for example). This being so, the frequency used may be higher for this type of light sources.

Figure 2A:
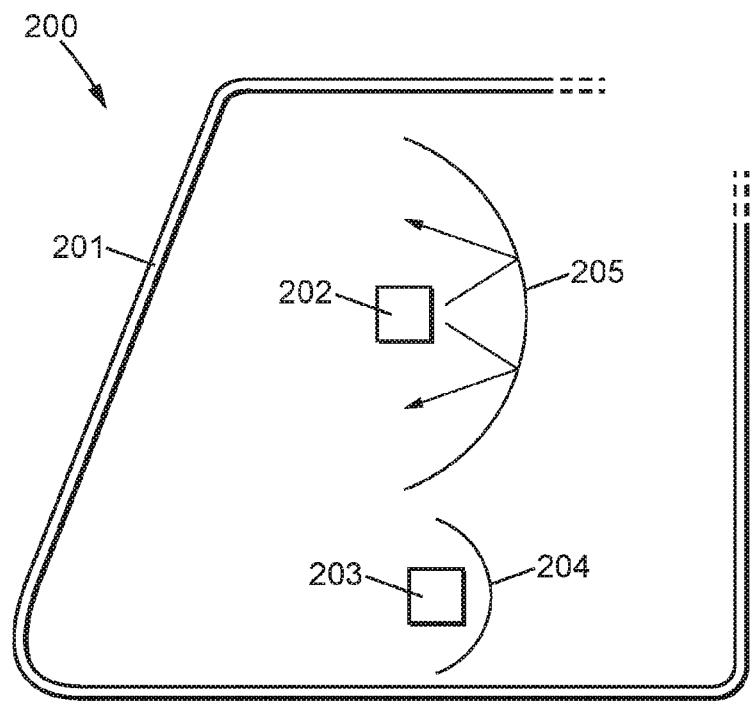
FIGS. 2a and 2b show light-emitting devices, notably lighting and/or signaling devices for motor vehicles in two embodiments of the invention.
Figure 2B:
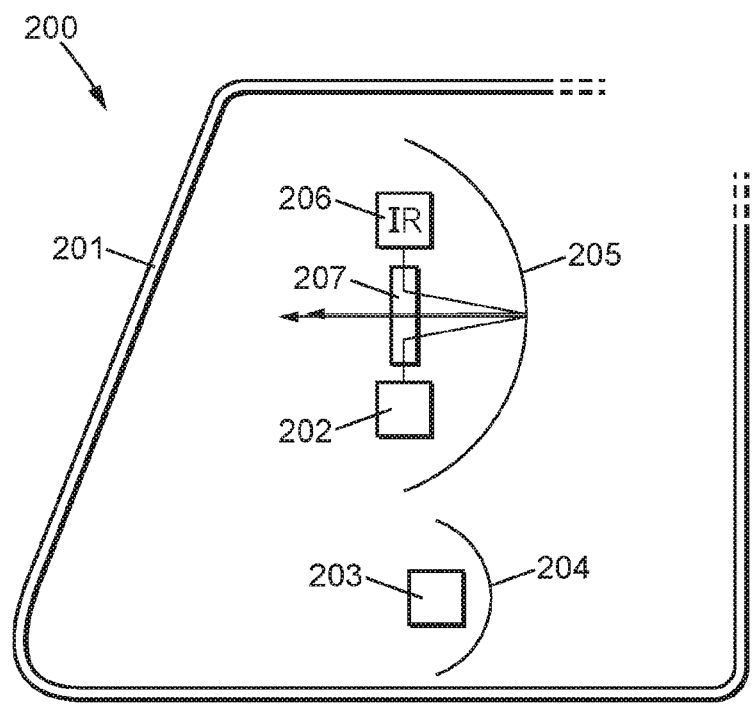

FIGS. 2a and 2b show light-emitting devices, notably lighting and/or signaling devices 200 for motor vehicles in two embodiments of the invention.

In FIG. 2a, the vehicle lighting device 200 comprises:
a housing 201 (including a transparent or at least translucent front part);
a set of high-power lighting diode(s) 202 that can operate as low beams (for example);
a first reflector 205 adapted to direct the light rays coming from the lighting diodes 202 toward the transparent/translucent part of the housing 201;
a set of signaling diode(s) 203 (of lower power than the lighting diodes 202) that can operate as daylight running lights (for example);
a second reflector 204 adapted to direct the light rays coming from the signaling diodes 203 toward the transparent/translucent part of the housing 201.

In this embodiment, it is possible to use the set of lighting diode(s) 202 as communication/detection devices when this set of lighting diode(s) 202 is energized (i.e. when the low beams are necessary for driving and/or activated by the driver). If this set of lighting diode(s) 202 is not energized, it is then possible to energize the daylight running lights (the set of signaling diode(s) 203) and to use the latter lights as communication/detection devices.

This being so, there are activated communication/detection devices in the lighting device 200 at all times (day and night).

Of course, the daylight running lights may be outside the headlight assembly or housing 201.

In FIG. 2b, the vehicle lighting device 200 comprises:
a housing 201 (including a transparent or at least translucent front part);
a set of high-power lighting diode(s) 202 that can operate as low beam or high beam (for example);
a set of high-power infrared (IR) diode(s) 206;
an optional waveguide (or light guide) 207;
a first reflector 205 adapted to direct toward the transparent/translucent part of the housing 201 the light/IR rays coming from the lighting diodes 202 and the infrared diodes 206 (where necessary, the light/IR rays pass through the waveguide 207 before being reflected at the first reflector 205);
a set of signaling diode(s) 203 (of lower power than the lighting diodes 202) that can operate as daylight running lights (for example);
a second reflector 204 adapted to direct the light rays coming from the signaling diodes 203 toward the transparent/translucent part of the housing 201.

In this embodiment it is possible to use the set of lighting diode(s) 202 as communication/detection devices when this set of lighting diode(s) 202 is energized (i.e. when the low beams are necessary for driving and/or activated by the driver).

The waveguide 207 is optional in this embodiment. Thus it is possible to dispense with it by positioning the two sets of diode(s), the lighting diodes 202 and the infrared diodes 206 side by side, for example, close to the optical center of the first reflector 205.

In addition to this or instead of this, when this set of lighting diode(s) 202 is not energized, it is possible to use the set of IR or infrared diode(s) 206 as communication/detection devices.

Assuming that the set of IR or infrared diode(s) 206 is used in addition to the set of lighting diode(s) 202 as communication/detection devices, it is possible:
for these two sets of diodes 206, 202 to transmit the same information simultaneously;
for one of the two sets of diodes 206 or 202 to transmit a portion of the information to be transmitted while the second set of diodes 206 or 202 transmits the complementary portion;
for one of the two sets of diodes 206 or 202 to transmit the information to be transmitted while the second set of diodes 206 or 202 transmits an error corrector code for that same information.

Thus if the low beams are not being used, the set of IR or infrared diode(s) 206 can make it possible to transmit information without that transmission being visible to road users and without it being necessary to turn on the (visible) lights of the motor vehicle 100, 102 to enable this transmission.

Of course, it is possible to combine the embodiments shown in FIGS. 2a and 2b.

The set or sets of diodes 206 or 202 used as emitters of a communication/detection device may be chosen by a control circuit, either integrated into the lighting device 200 or not. That control circuit (not shown) therefore receives the information to be transmitted via an interface provided for this purpose and determines the set or sets of diodes 206 or 202 to be caused to blink.

This circuit may be, for example:
a processor in the form of a computer program adapted to interpret instructions, or
an electronic circuit card the operation of which is defined in the silicon, or again
a programmable electronic chip such as an FPGA (Field-Programmable Gate Array).

Moreover, it is equally possible for the visible light beam emitted by the lighting diode 202 to be masked for certain areas in space (e.g. masking of the high beams to avoid dazzling a driver approaching in the opposite direction) whereas the infrared beam emitted by the infrared diode 206 is not masked in those areas. This is notably possible using a mask blocking only some wavelengths or providing, at least in part, different optical paths for the different beams (the masking occurring on an optical path on which the beams are separate).

By way of nonlimiting illustration, the various visible light sources in a vehicle may be:
at the front:
"low beam" lights;
"high beam" lights;
DRL;
"sidelights";
laser spotlights;

position lights (marking lights);
at the rear:
position lights;
stoplights;
foglights;
reversing lights.

Figure 3A:
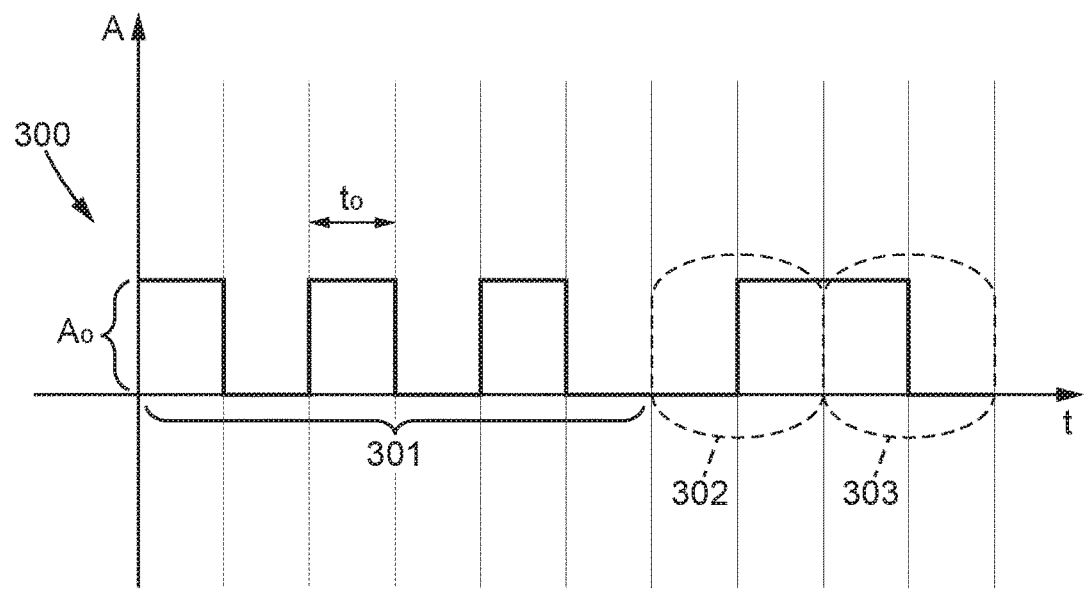
FIGS. 3a and 3b show energization signals of lighting devices in accordance with some embodiments of the invention.
Figure 3B:
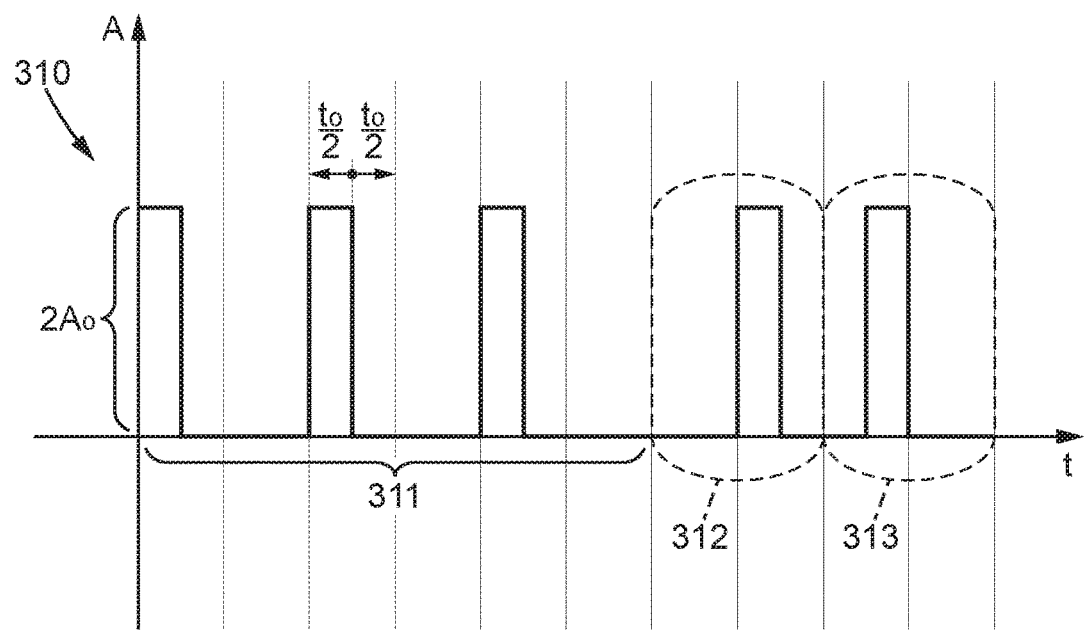

FIGS. 3a and 3b show energization signals of light-emitting devices in accordance with some embodiments of the invention.

In the embodiment shown in FIG. 3a, the energization or pulse signal 300 of the light-emitting device is not a constant current: here the energization signal is a pulse energization signal with period $2t_0$ and amplitude $A_0$.

This pulse signal 300 notably enables so-called Manchester coding of the information to be transmitted.

For example, before any transmission of information begins, it is possible to emit a standard pattern 301 shared at least by the emitter and the receiver. This standard pattern 301 enables the receiver to recognize a start of transmission and to synchronize its internal clock to the clock of the emitter.

Following on from this standard pattern 301, the information bits are coded over a period, the part of the signal 302 corresponding for example to a 0 bit and the part of the signal 303 corresponding for example to a 1 bit.

The average amplitude of the signal is $A_0/2$. Accordingly, if the required amplitude for the lighting or signaling device is $A_1$ (i.e. no blinking), the value is $A_0$ is chosen as being twice the amplitude of $A_1$ when blinking is activated by the control circuit.

Moreover, there may arise situations in which the amplitude $A_0$ cannot provide a sufficient transmission distance (the distance effectively depending on this amplitude): this is notably the case if the sets of diodes used as communication/detection devices are not intended to cast light far from the vehicle, but only intended to be seen (e.g. the daylight running lights, stop lights, position lights, etc.). On these assumptions, it is possible for the energization amplitude of these sets of diodes to be increased by a factor N (e.g. by a factor of two as shown in FIG. 3b).

To prevent the luminous intensity perceived by the driver (or any other person) increasing, it is then possible to reduce the periods of emission of light by the same factor N (e.g. $t_0/2$ as shown in FIG. 3b). Because the efficacy of the emitter can decrease when the amplitude $A_0$ increases, it must be taken into consideration with the aim of guaranteeing a constant luminous intensity perceived by the driver.

Therefore, in the embodiment shown in FIG. 3b, the energization signal 300 of the light-emitting device is a pulse energization signal with period $2t_0$ and amplitude $2A_0$. The pattern 301 is then converted into the pattern 311. Moreover, the bits are coded using the signal parts 312 and 313.

Of course, the factor N can take numerous values such as 3, 4, 5 or 6. This factor N can be adapted as a function of the necessary transmission distance imperatives and/or as a function of the inherent characteristics of the light source (e.g. maximum voltage or intensity).

Of course, the present invention is not limited to the embodiments described above by way of example; it is encompasses other variants.

For example, it is possible to use any code for the transmission of the data other than the Manchester code described above. For example, it is possible to use a differential Manchester code, a Miller code, an NRZ (Non Return to Zero) code, an NRZI (Non Return to Zero Inverted) code, an NRZM (Non Return to Zero Mark) code, an RZ (Return to Zero) code or any other code. Of course, if the list of the listed codes contains only so-called two-level (of amplitude) codes, it is equally possible to use codes having more levels (e.g. AMI, Bipolar, BHDn, B8ZS, HDB3, MLT-3, etc.).

Moreover, the diodes of the description may be replaced by lasers or laser diodes. Using lasers or laser diodes makes directional communication possible and makes it possible to increase the communication range for an equivalent power.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light-emitting device for a motor vehicle, including:
at least one first light source to emit a first modulated light beam coding information;
at least one second light source to emit a second modulated light beam coding information;
a control device adapted:
to determine, on receiving information to be transmitted via said light-emitting device, if said first modulated light beam emitted by said at least one first light source should be modulated to code said information to be transmitted or if said second modulated light beam emitted by said at least one second light source should be modulated to code said information to be transmitted, said determination depending on information relating to a local solar illumination;
as a function of said determination, to modulated said first modulated light beam and/or the energization of said second modulated light beam to code said information to be transmitted;
wherein a controller is configured to modify a first energization signal at a first coding frequency less than a second coding frequency used to effect the modification of a second energization signal.

2. The light-emitting device according to claim 1, wherein:
said at least one first light source is adapted to emit visible light;
said at least one second light source is adapted to emit infrared light.

3. The light-emitting device according to claim 1, wherein said control device includes means for detecting energization of said at least one first light source, said information relating to the local solar illumination depending on said detection.

4. The light-emitting device according to claim 1, wherein said control device is adapted to command the emission of a single light beam by a single one of said at least one first light source and said at least one second light source as a function of said determination and to modulate said single light beam as a function of said determination to code said information to be transmitted.

5. The light-emitting device according to claim 1, wherein said control device is adapted to command the emission of a first light beam by said at least one first light source and a second light beam by said at least one second light source as a function of said determination and to modulate a single one of said first light beam and said second light beam to code said information to be transmitted as a function of said determination.

6. The light-emitting device according to claim 1, wherein said light-emitting device includes at least:
a headlight assembly;

said at least one first light source and/or said at least one second light source is installed in said headlight assembly.

7. The light-emitting device according to claim 1, wherein said controller is adapted to determine that said second energization signal must be modified if the energization of said at least one first light source is below a predetermined threshold.

8. The light-emitting device according to claim 1, wherein said controller is adapted to determine that said first energization signal must not be modified if the energization of said at least one first light source is below a predetermined threshold.

9. The light-emitting device according to claim 1, wherein a coding frequency of said information to be transmitted on modification of said first energization signal and/or said second energization signal is greater than 25 Hz.

10. The light-emitting device according to claim 9, wherein said controller is further configured to reduce said coding frequency of said information should at least one of the following conditions apply:
- an error rate during a preceding transmission has exceeded a predetermined value;
- information is received relating to a presence of rain or fog.

11. The light-emitting device according to claim 1, wherein the light-emitting device is at least one of a lighting device or a signaling device.

12. A light-emitting device for a motor vehicle, including:
a light source;
a controller adapted:
to modify an energization signal of said light source to code information to be transmitted, the modification of said energization signal including multiplication of said energization signal with a coding signal including forms repeated in said energization signal, said forms having a given temporal extension and an amplitude,
on reception of a command, to reduce said temporal extension of said forms and to increase said amplitude of said forms in said energization signal.

13. The light-emitting device according to claim 12, wherein said controller is adapted to modify said energization signal in accordance with a Manchester code.

14. The light-emitting device according to claim 12, wherein the reduction of said temporal extension depends on said increase of said amplitude.

15. The light-emitting device according to claim 12, wherein, said coding signal including a coding frequency, said coding frequency is retained on reducing said temporal extension of said forms.

16. The light-emitting device according to claim 12, wherein said control device includes means for detecting energization of said at least one first light source, said information relating to the local solar illumination depending on said detection.

17. The light-emitting device according to claim 12, wherein said control device is adapted to command the emission of a single light beam by a single one of said at least one first light source and said at least one second light source as a function of said determination and to modulate said single light beam as a function of said determination to code said information to be transmitted.

18. The light-emitting device according to claim 12, wherein said control device is adapted to command the emission of a first light beam by said at least one first light source and a second light beam by said at least one second light source as a function of said determination and to modulate a single one of said first light beam and said second light beam to code said information to be transmitted as a function of said determination.

19. The light-emitting device according to claim 12, wherein a controller is configured to modify a first energization signal at a first coding frequency less than a second coding frequency used to effect the modification of a second energization signal.

20. The light-emitting device according to claim 13, wherein, said coding signal including a coding frequency, said coding frequency is retained on reducing said temporal extension of said forms.

21. The light-emitting device according to claim 12, wherein the light-emitting device is at least one of a lighting device or a signaling device.

* * * * *